(12) United States Patent
Oguri

(10) Patent No.: US 8,922,495 B2
(45) Date of Patent: Dec. 30, 2014

(54) INPUT DEVICE WITH DISPLAY PANEL

(75) Inventor: Hirofumi Oguri, Nagoya (JP)

(73) Assignee: Brother Kogyo Kabushiki Kaisha, Nagoya-Shi, Aichen-Ken (JP)

( * ) Notice: Subject to any disclaimer, the term of this patent is extended or adjusted under 35 U.S.C. 154(b) by 808 days.

(21) Appl. No.: 12/749,316

(22) Filed: Mar. 29, 2010

(65) Prior Publication Data

US 2011/0074708 A1 Mar. 31, 2011

(30) Foreign Application Priority Data

Sep. 28, 2009 (JP) ................................. 2009-222812

(51) Int. Cl.
*G06F 3/041* (2006.01)
*G06F 3/045* (2006.01)
*G06F 3/0488* (2013.01)

(52) U.S. Cl.
CPC ................................. *G06F 3/04886* (2013.01)
USPC ........................................ 345/173; 345/174

(58) Field of Classification Search
USPC .......................................................... 345/173
See application file for complete search history.

(56) References Cited

U.S. PATENT DOCUMENTS

| | | | |
|---|---|---|---|
| 7,948,476 B2 | 5/2011 | Goto et al. | |
| 2005/0200611 A1 | 9/2005 | Goto et al. | |
| 2005/0259378 A1* | 11/2005 | Hill et al. | 361/271 |
| 2009/0167704 A1* | 7/2009 | Terlizzi et al. | 345/173 |
| 2010/0110019 A1* | 5/2010 | Ozias et al. | 345/173 |
| 2010/0302174 A1* | 12/2010 | Cornell et al. | 345/173 |
| 2011/0090168 A1 | 4/2011 | Goto et al. | |
| 2012/0038578 A1 | 2/2012 | Goto et al. | |

FOREIGN PATENT DOCUMENTS

| | | |
|---|---|---|
| CN | 1510642 A | 7/2004 |
| CN | 1701298 A | 11/2005 |
| CN | 101183293 A | 5/2008 |
| JP | H07-287769 A | 10/1995 |
| JP | 2002-287904 A | 10/2002 |
| JP | 2003-043450 A | 2/2003 |

(Continued)

OTHER PUBLICATIONS

The State Intellectual Property Office of the People's Republic of China, Notification of First Office Action for Chinese Patent Application No. 201010150899.7, issued Jun. 5, 2012.

(Continued)

*Primary Examiner* — Charles V Hicks
(74) *Attorney, Agent, or Firm* — Scully, Scott, Murphy & Presser, P.C.

(57) ABSTRACT

An input device includes a display, a touch panel and a cover member. The cover member fixes the display and the touch panel so that a display region of the display is exposed via a touch panel reaction region of the touch panel from an opening of the cover member and a surrounding region is defined in the touch panel reaction region between an inner periphery of the opening and an outer periphery of the display region. A controller of the input device is configured to: set a button display region in the display region; set a button reaction region in the touch panel reaction region to correspond to and overlap with the button display region; set a surrounding reaction region in the surrounding region to correspond to the button display region; acquire a coordinate of a pressed position where the touch panel reaction region is pressed; and select a process allocated to the button reaction region when the coordinate of the pressed position is located in the surrounding reaction region.

10 Claims, 10 Drawing Sheets

(56) References Cited

FOREIGN PATENT DOCUMENTS

| | | |
|---|---|---|
| JP | 2003-296027 A | 10/2003 |
| JP | 2005-284809 A | 10/2005 |
| JP | 2008-129823 A | 6/2008 |
| JP | 2008-234287 A | 10/2008 |
| JP | 2008-269574 A | 11/2008 |
| JP | 2009-009261 A | 1/2009 |
| JP | 2009-059125 A | 3/2009 |
| JP | 2009-164757 A | 7/2009 |
| WO | 2004/111827 A1 | 12/2004 |

OTHER PUBLICATIONS

Japan Patent Office, Notification of Reason for Refusal for Japanese Patent Application No. 2009-222812, dispatched Jul. 26, 2011.

* cited by examiner

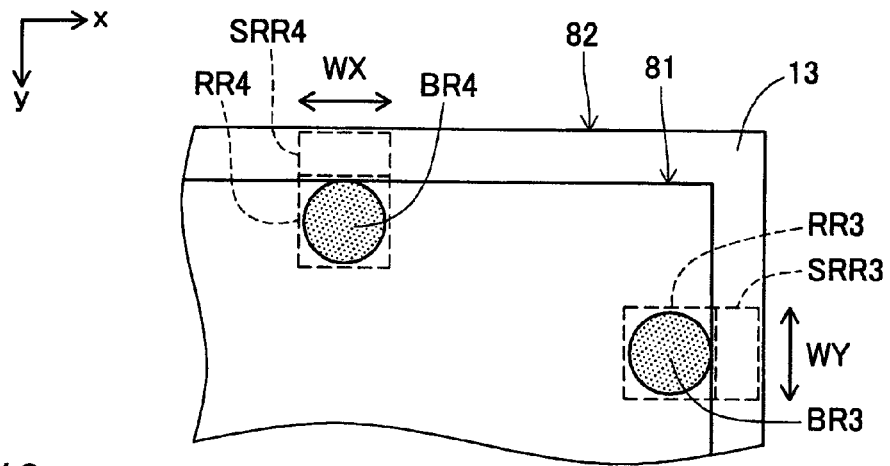
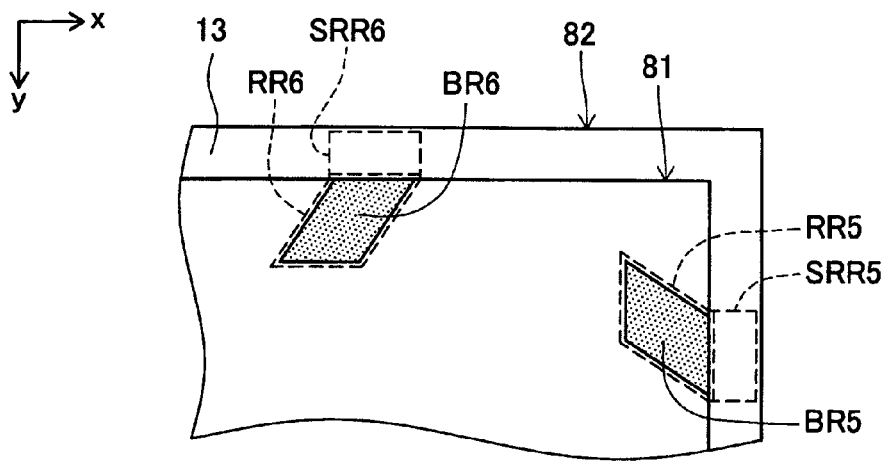
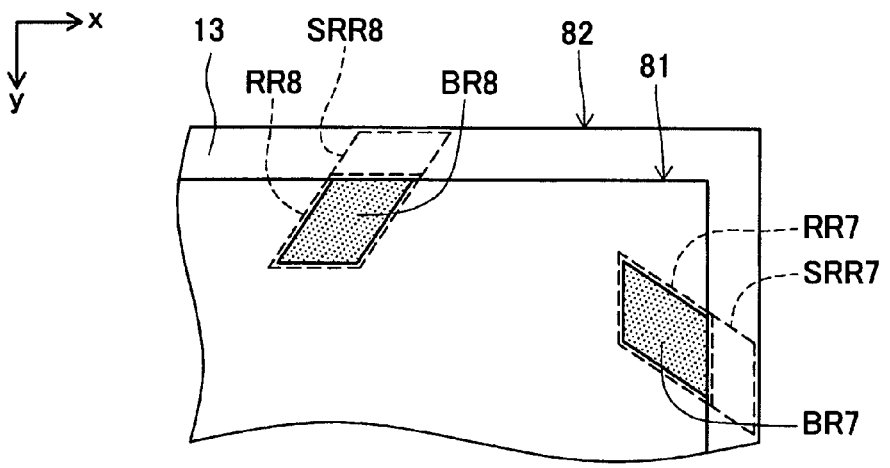

INPUT DEVICE WITH DISPLAY PANEL

CROSS REFERENCE TO RELATED APPLICATION

The present disclosure relates to the subject matter contained in Japanese patent application No. 2009-222812 filed on Sep. 28, 2009, which is expressly incorporated herein by reference in its entirety.

TECHNICAL FIELD

The present disclosure relates to an input device with a display panel, which can ease user's input.

BACKGROUND ART

A touch panel device is known in which an image display unit and a touch panel are fixed using a cover member having an opening so as to expose an image display region from the opening with the touch panel disposed on the image display unit. Patent Document 1 discloses a touch panel device in which a reaction region of a button displayed at an end of an image display region is extended in a direction opposite to the opening.

Patent Document 1: JP-A-2008-129823

In the touch panel device disclosed in Patent Document 1, when it is intended to press a first button located on the inner side of a second button displayed at the end of the image display region, the second button displayed at the end of the image display region may react. The present disclosure provides a technique for solving this problem.

SUMMARY

An input device disclosed here includes, but not limited to, a display including a display region; a touch panel including a touch panel reaction region larger in area than the display region; a cover member having an opening larger in area than the display region and fixing the display and the touch panel so that the touch panel is disposed on the display, the display region is exposed via the touch panel reaction region from the opening and a surrounding region is defined in the touch panel reaction region between an inner periphery of the opening and an outer periphery of the display region; and a controller configured to: set a button display region in the display region; set a button reaction region in the touch panel reaction region to correspond to and overlap with the button display region; set a surrounding reaction region in the surrounding region to correspond to the button display region; acquire a coordinate of a pressed position where the touch panel reaction region is pressed; and select a process allocated to the button reaction region when the coordinate of the pressed position is located in the surrounding reaction region.

A height difference from a display plane of the display region is generally formed around the display region by the opening of the cover member. When a user intends to press the button display region displayed in the vicinity of the opening, the user has to avoid a finger tip from contacting with the opening, thereby reducing the convenience for the user. Accordingly, in the input device disclosed here is arranged so that the size of the touch panel reaction region of the touch panel is set to be greater than the size of the display region of the display to provide the surrounding region which is not located in the display region but is located in the touch panel reaction region. When the button display region is set and displayed on the display, the button reaction region is set in the touch panel reaction region to correspond to and overlap with the button display region. Further, the surrounding reaction region is set in the surrounding region to correspond to the button display region. When a coordinate of a pressed position where the touch panel reaction region is pressed is acquired and the acquired coordinate of the pressed position is located in the surrounding reaction region, a process allocated to the button reaction region is selected. Accordingly, the input device can provide the button reaction region and the surrounding reaction region for the button display region displayed at an end of the display region. Therefore, it is possible to easily press the button display region displayed in the vicinity of the opening, thereby increasing the convenience for the user.

BRIEF DESCRIPTION OF THE DRAWINGS

FIG. 9 is a diagram illustrating a fourth embodiment.

FIG. 10 is a diagram (a first diagram) illustrating a fifth embodiment.

FIG. 11 is a diagram (a second diagram) illustrating the fifth embodiment.

DESCRIPTION OF THE PREFERRED EMBODIMENT

Figure 1A:
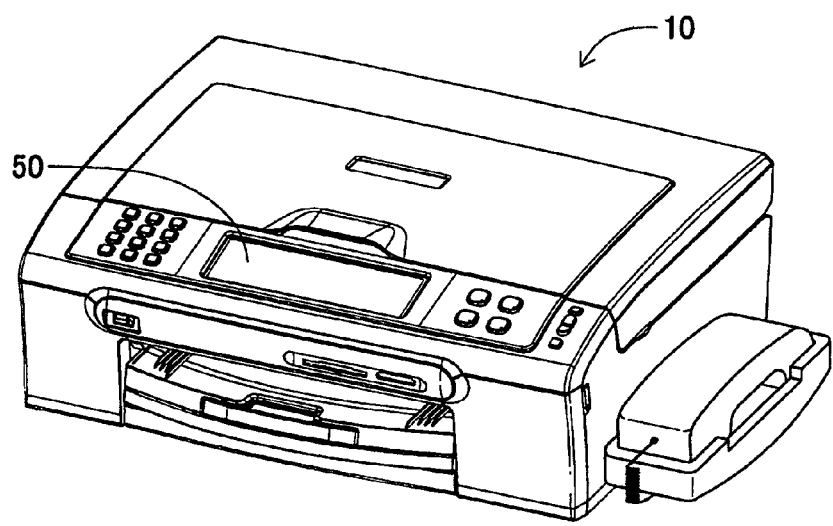
FIG. 1A is a diagram illustrating an outer appearance of a multifunction device 10.
Figure 1B:
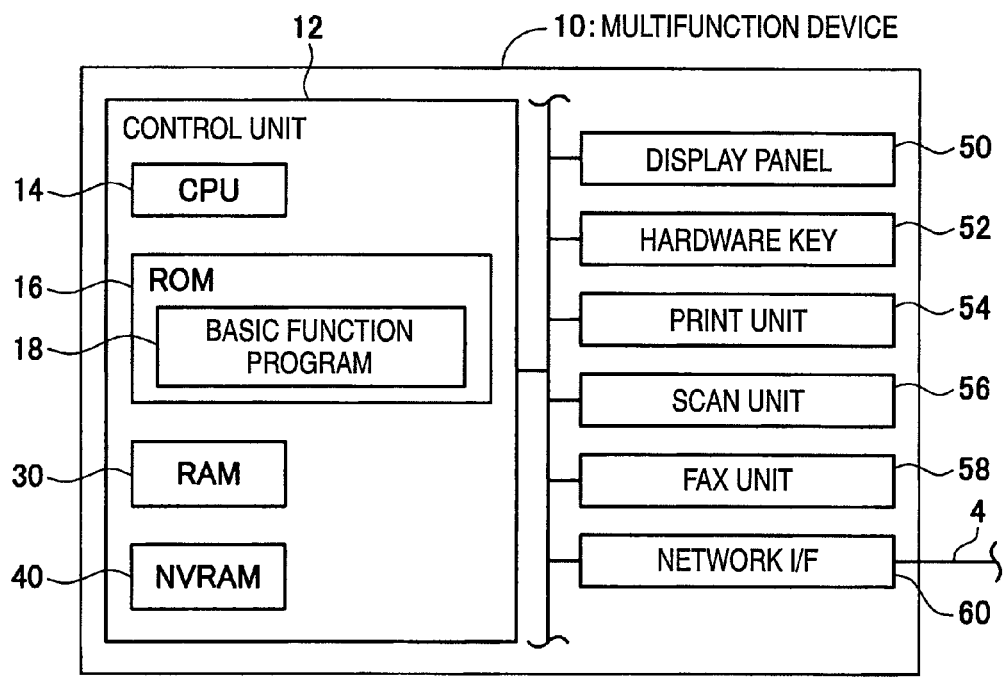
FIG. 1B is a block diagram of the multifunction device 10.

Embodiments will be described with reference to the accompanying drawings. FIG. 1A is a diagram illustrating an outer appearance of a multifunction device 10 and FIG. 1B is a block diagram of the multifunction device 10. The multifunction device 10 has a printer function, a scanner function, a copy function, a facsimile function, and a telephone function. As shown in FIG. 1A, a display panel 50 is disposed on the top front surface of the multifunction device 10. The display panel 50 is a touch panel which can detect coordinates of a position touched by a user. Various touch panel buttons such as a menu button, a telephone directory button, and a history button are displayed on the display panel 50.

The configuration shown in FIG. 1B will be described. The multifunction device 10 includes a control unit 12, a display panel 50, a hardware key 52, a print unit 54, a scan unit 56, a FAX unit 58, and a network interface 60. The control unit 12 includes a CPU 14, a ROM 16, a RAM 30, and an NVRAM 40.

The CPU 14 performs various processes on the basis of programs stored in the ROM 16. The processes performed by the CPU 14 will be described in detail later. The ROM 16 stores a basic function program 18 for controlling basic operations of the multifunction device 10. The basic function program 18 is used, for example, to generate display data displayed on the display panel 50 or to perform a process corresponding to a button reaction region.

The RAM 30 is a volatile memory and includes a memory area storing various data generated in the course of performing the processes on the basis of the basic function program 18. The NVRAM 40 is a nonvolatile memory and includes a memory area storing various parameters used for the CPU 14 to perform the processes on the basis of the basic function program 18. The memory area of the NVRAM 40 also stores a button table. The button table is a table storing correlations between the coordinate of the button reaction region and the process details allocated to the button reaction region for each button displayed on the display panel 50. For example, the process details may include a menu display and a telephone directory display.

The network interface 60 is connected to a LAN line. The multifunction device 10 can communicate with an externally-connected personal computer and can access the Internet.

Figure 2:
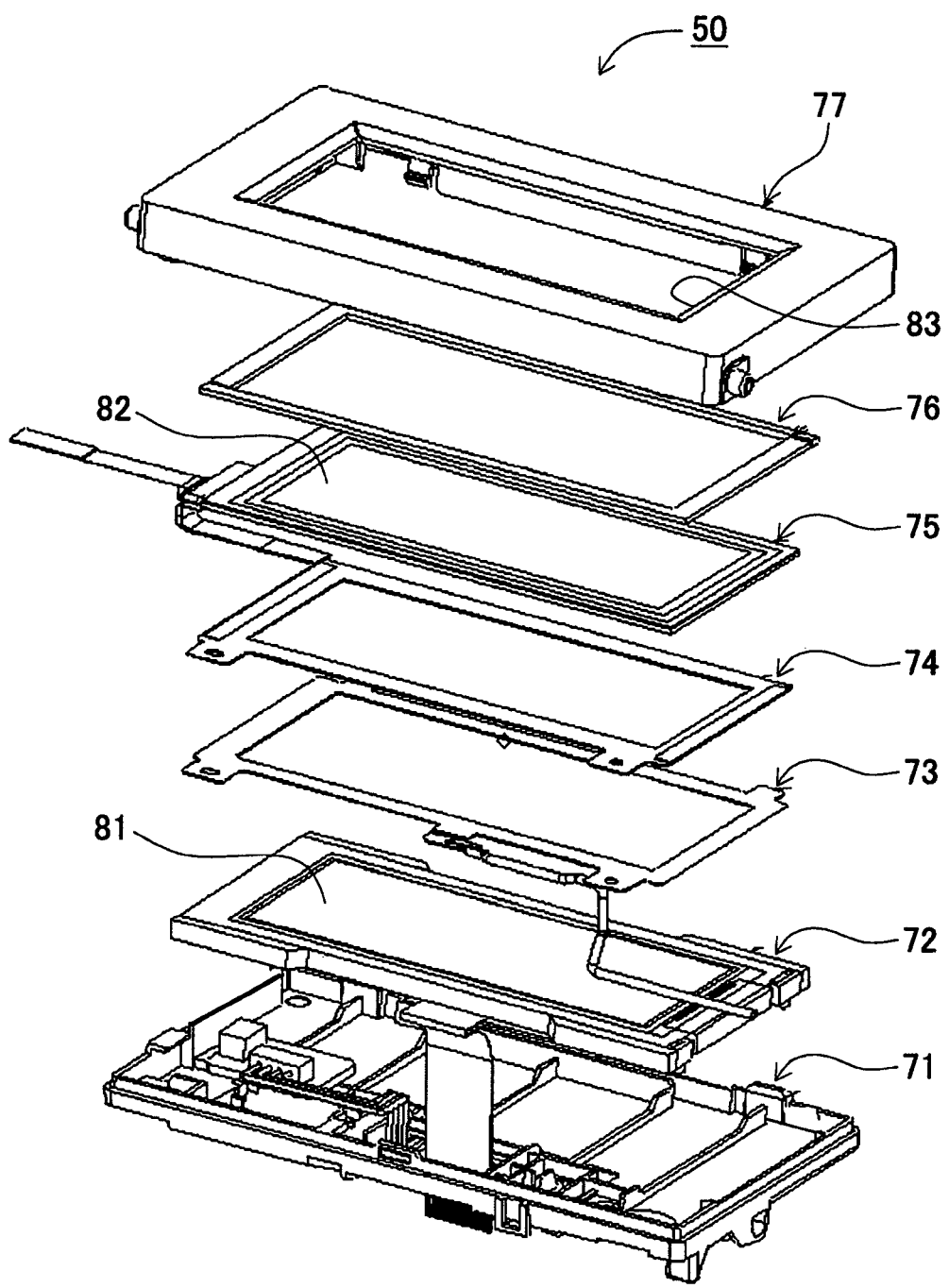
FIG. 2 is an exploded perspective view illustrating a configuration of a display panel 50.

The configuration of the display panel 50 will be described below with reference to FIG. 2. The display panel 50 includes an LCD lower cover 71, an LCD (Liquid Crystal Display) 72, a plate 73, a frame sheet 74, a touch panel 75, a dust foam 76, and an LCD upper cover 77.

The LCD 72 is a known liquid crystal display. The LCD 72 includes an image display region 81 in which characters, figures, symbols, or the like are displayed. The LCD 72 is fixed substantially at the center of the LCD lower cover 71. The plate 73 is a plate-like member formed of metal and serves to remove static electricity. The frame sheet 74 is a sheet hiding the edges of the image display region 81 of the LCD 72.

The touch panel 75 has substantially the same size as insertion areas of the LCD lower cover 71 and the LCD upper cover 77 and is disposed to cover the LCD 72. The touch panel 75 includes a touch panel reaction region 82 from which a pressed position pressed by a user can be detected. Since the touch panel 75 is transparent, the user can view the details displayed in the image display region 81 of the LCD 72 through the touch panel 75. For example, resistive-film touch panel is used as the touch panel 75. The resistive-film touch panel is widely known and thus the details thereof are not described herein.

The dust foam 76 is a sponge-like member and serves to maintain the seal between the LCD upper cover 77 and the touch panel 75, thereby preventing the invasion of dust or the like. The LCD upper cover 77 includes an opening 83 through which the image display region 81 can be viewed. The size of the opening 83 is greater than that of the image display region 81.

The LCD lower cover 71, the LCD 72, the plate 73, the frame sheet 74, the touch panel 75, the dust foam 76, and the LCD upper cover 77 are sequentially fixed to overlap with each other, whereby the display panel 50 is formed. Accordingly, the display panel 50 is configured so that the image display region 81 and the touch panel reaction region 82 can be viewed from the opening 83 of the LCD upper cover 77.

Figure 3:
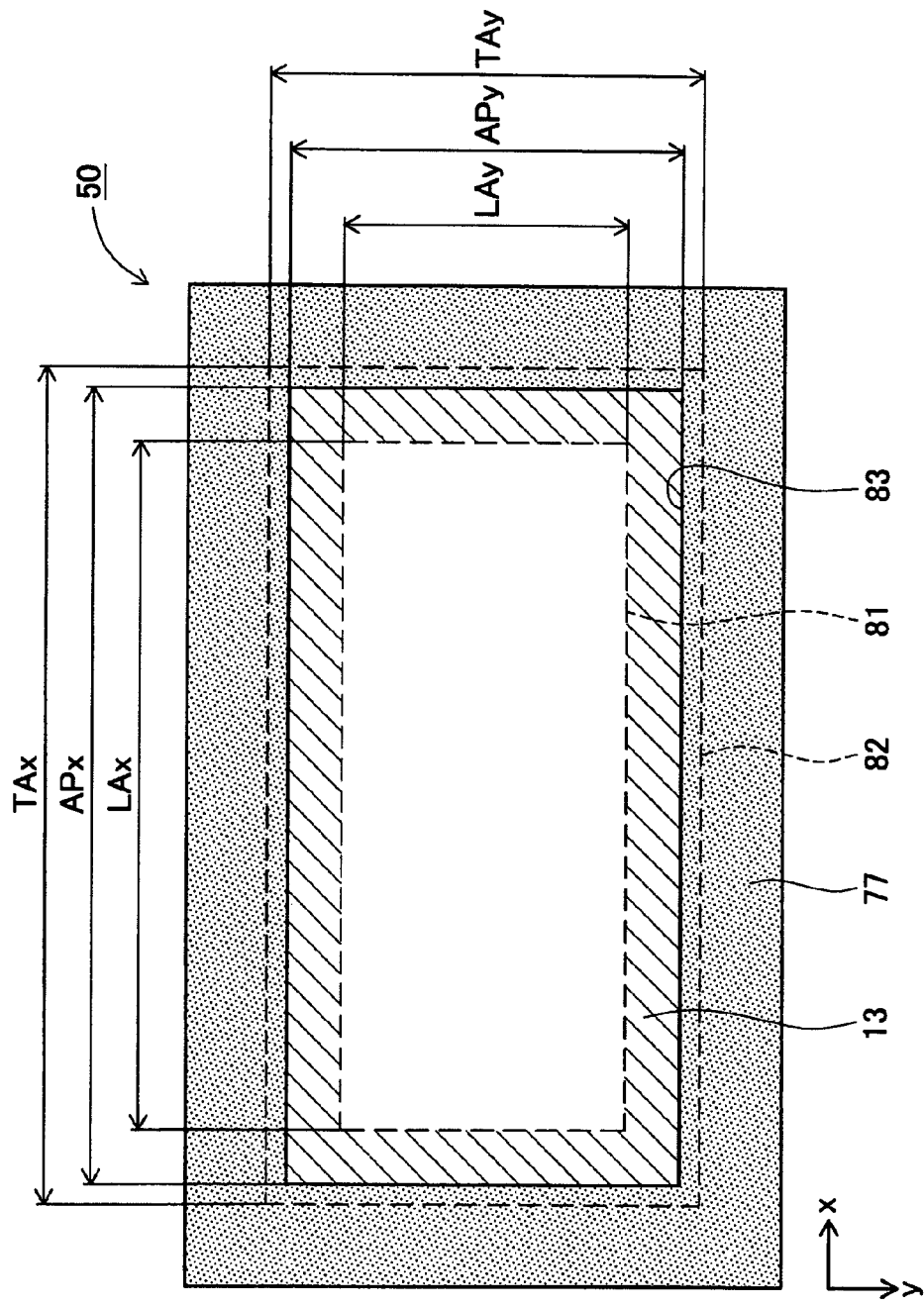
FIG. 3 is a top view of the display panel 50.
Figure 4:
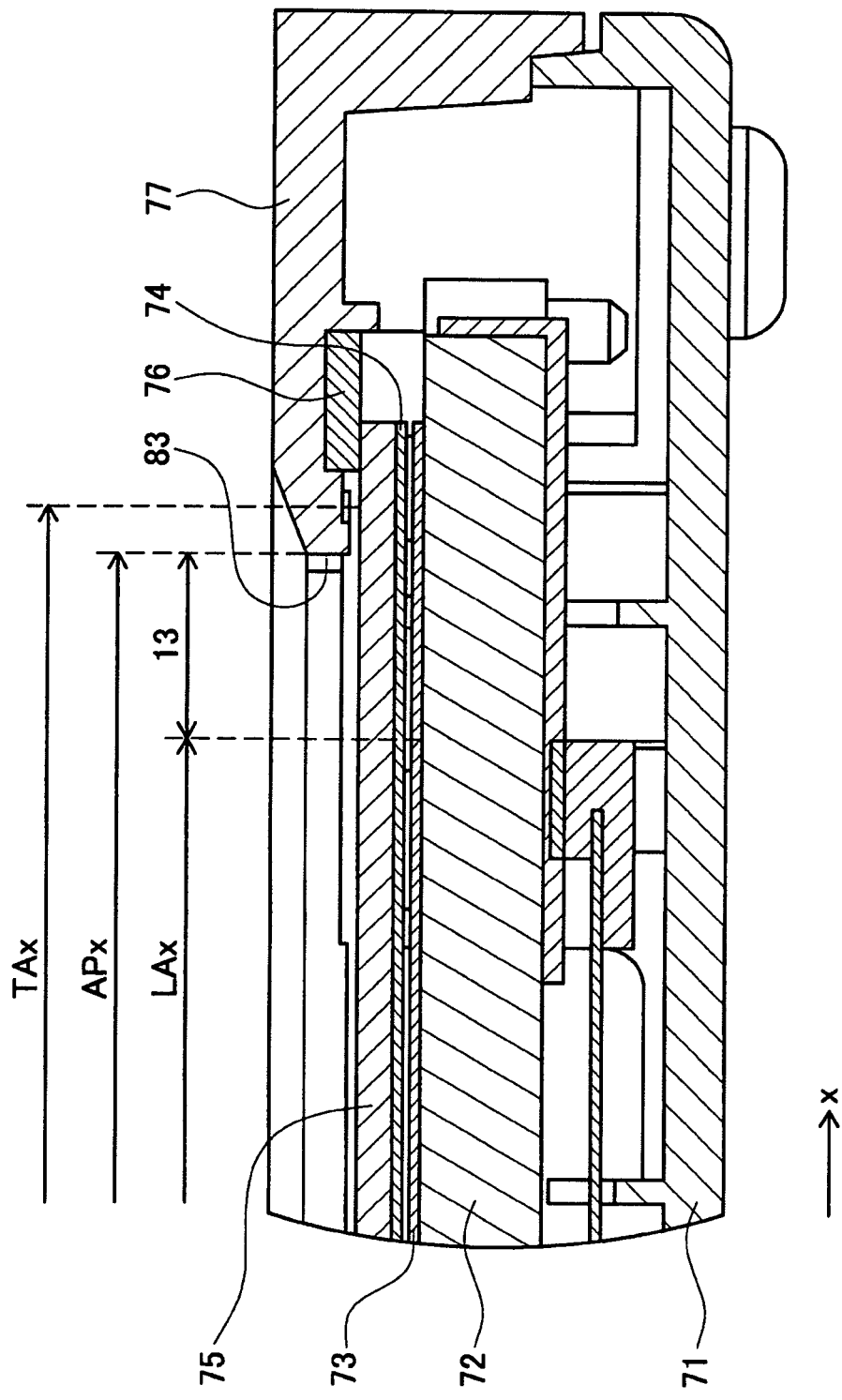
FIG. 4 is a partial sectional view in the x direction of the display panel 50.

The positional relationship of the image display region 81, the touch panel reaction region 82, and the opening 83 will be described with reference to FIGS. 3 and 4. FIG. 3 is a top view of the display panel 50. FIG. 4 is a partial sectional view in the x direction of the display panel 50. The image display region 81 has a length LAx in an x-direction of the image display region and a length LAy in a y-direction of the image display region. The touch panel reaction region 82 has a length Tax in an x-direction of the touch panel reaction region and a length TAy in a y-direction of the touch panel reaction region. The opening 83 has a length APx in an x-direction of the opening and a length APy in a y-direction of the opening. The x-direction length Tax of the touch panel reaction region 82 and the x-direction length APx of the opening 83 are greater than the x-direction length LAx of the image display region 81. The y-direction length TAy of the touch panel reaction region 82 and the y-direction length APy of the opening 83 are greater than the y-direction length LAy of the image display region 81. Accordingly, a surrounding region 13 (hatched portion in FIG. 3) in which the image display region 81 does not exist is formed between the inner edge of the opening 83 and the outer periphery of the image display region 81. A height difference from the display plane of the image display region 81 is formed around the image display region 81 by the opening 83.

Figure 5:
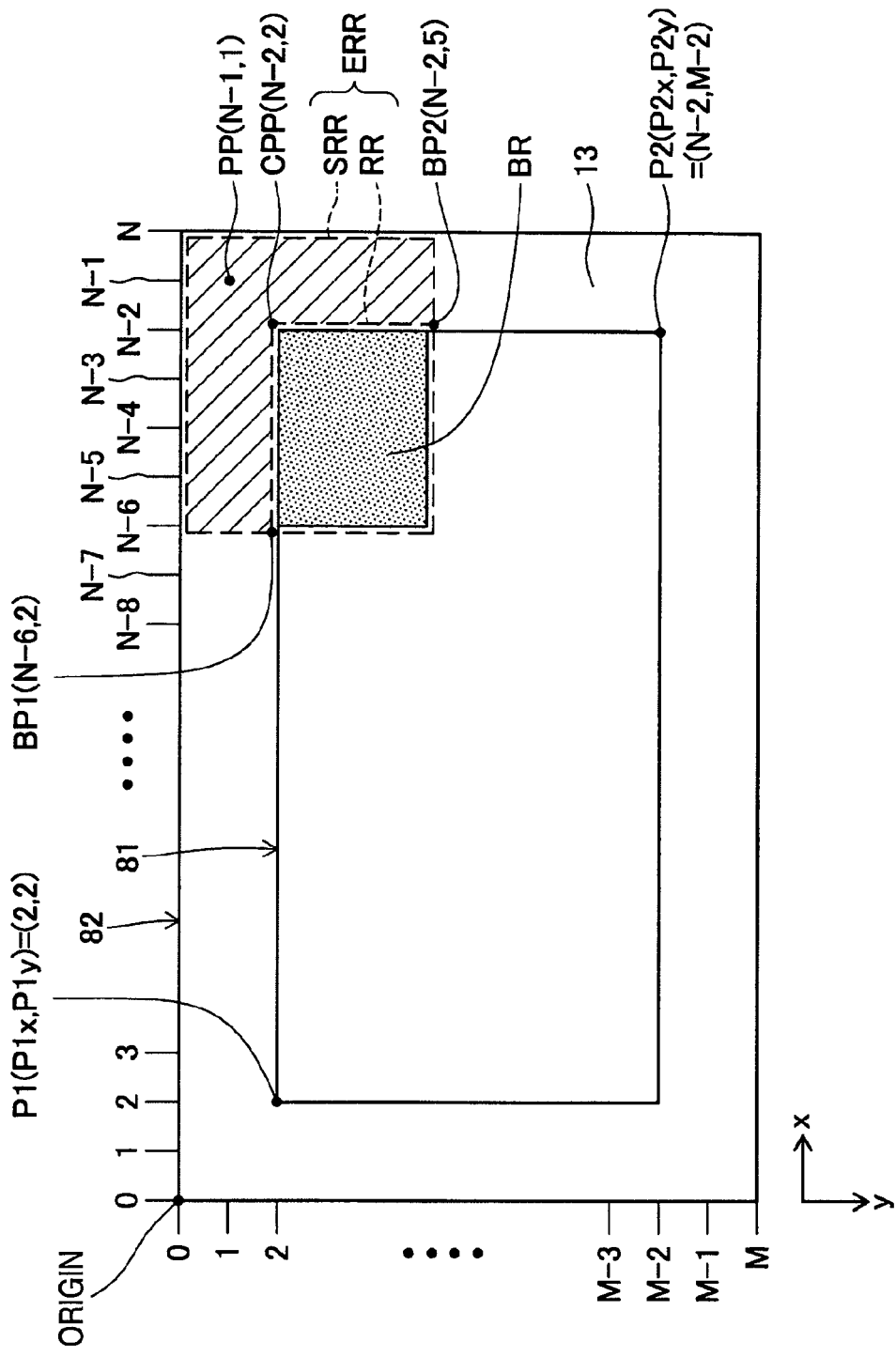
FIG. 5 is a top view of an image display region 81 and a touch panel reaction region 82.

Buttons displayed in the image display region 81 will be described. FIG. 5 is a top view of the image display region 81 and the touch panel reaction region 82. The image display region 81 and the touch panel reaction region 82 have common coordinate axes. In this embodiment, the upper-left corner of the touch panel reaction region 82 is set to an origin (0, 0), the x coordinate value (in the horizontal direction) ranges from 0 to N, and the y coordinate value (in the vertical direction) ranges from 0 to M. The image display region 81 is defined as a rectangular shape including a first point P1 (P1$x$, P1$y$) and a second point P2 (P2$x$, P2$y$) located at corners in a diagonal line. The x coordinate P1$x$ of the first point P1 is the minimum value in the x direction. The y coordinate P1$y$ of the first point P1 is the minimum value in the y direction. The x coordinate P2$x$ of the second point P2 is the maximum value in the x direction. The y coordinate P2$y$ of the second point P2 is the maximum value in the y direction. In this embodiment, it is assumed that the coordinate (P1$x$, P1$y$) of the first point P1 is (2, 2) and the coordinate (P2$x$, P2$y$) of the second point P2 is (N−2, M−2).

Various buttons are displayed in the image display region 81 of the LCD 72. A region occupied by a displayed button is defined as a button display region BR. A button reaction region RR corresponding to the button display region BR exists in the touch panel reaction region 82. The button reaction region RR has substantially the same size as the button display region BR so as to overlap with the button display region BR (the button reaction region RR is indicated by a dotted line in FIG. 5). The button reaction region RR is defined as a rectangular shape including a first point BP1 and a second point BP2 located at corners in a diagonal line. In this embodiment, it is assumed that the coordinate of the first BP1 is (N−6, 2) and the coordinate of the second point BP2 is (N−2, 5).

A surrounding button reaction region SRR (a hatched portion in FIG. 5) exists in the surrounding region 13 so as to correspond to the button display region BR. The surrounding button reaction region SRR will be described later. The region including the button reaction region RR and the surrounding button reaction region SRR is defined as an extended button reaction region ERR. A pressed coordinate (Dx, Dy) of a pressed point in the touch panel reaction region 82 is acquired.

Figure 6:
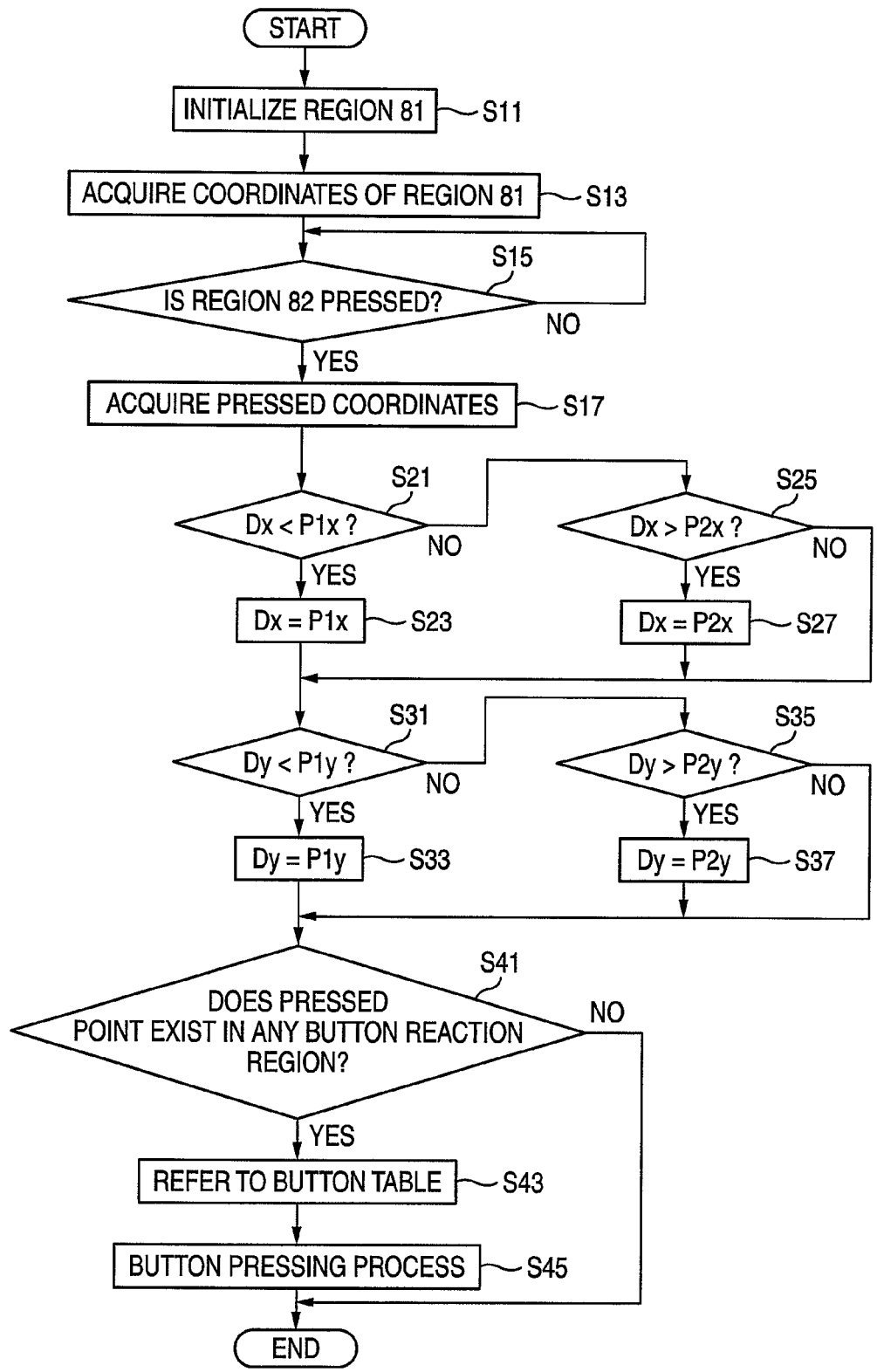
FIG. 6 is a flowchart illustrating operations of the display panel 50.

The operation of the display panel 50 according to this embodiment will be described with reference to the flowchart shown in FIG. 6. In S11, the CPU 14 initializes the image display region 81. In the initialization, a process of clarifying the coordinates of the first point P1 and the second point P2 in the image display region 81 is performed.

In S13, the CPU 14 acquires the coordinate of the image display region 81. In this embodiment, as shown in FIG. 5, the coordinate (P1x, P1y)=(2, 2) of the first point P1 of the image display region 81 and the coordinate (P2x, P2y)=(N−2, M−2) of the second point P2 are acquired and are stored in the RAM 30.

In S15, the CPU 14 determines whether the touch panel reaction region 82 of the touch panel 75 is pressed by a user. When it is determined that the touch panel reaction region is not pressed (NO in S15), the CPU is in a standby state in S15. When it is determined that the touch panel reaction region is pressed (YES in S15), the process of S17 is performed. In S17, the CPU 14 acquires the pressed coordinate (Dx, Dy) of the pressed point pressed by the user and stores the acquired pressed coordinate in the RAM 30.

In S21, the CPU 14 determines whether the x coordinate Dx of the pressed point is smaller than the x coordinate P1x of the first point P1. When it is determined that the x coordinate Dx is smaller than the x coordinate P1x (YES in S21), it is determined that the pressed point is located in the surrounding region 13 and the process of S23 is performed. In S23, the CPU 14 performs a process of changing the x coordinate Dx to the x coordinate P1x. Accordingly, a conversion process of converting the x coordinate Dx of the pressed point into a coordinate in the image display region 81 is performed. Then, the process of S31 is performed. On the other hand, when it is determined that the x coordinate Dx is equal to or greater than the x coordinate P1x (NO in S21), the process of S25 is performed.

In S25, the CPU 14 determines whether the x coordinate Dx of the pressed point is greater than the x coordinate P2x of the second point P2. When it is determined that the x coordinate Dx is equal or less than the x coordinate P2x (NO in S25), the process of S31 is performed. On the other hand, when it is determined that the x coordinate Dx is greater than the x coordinate P2x (YES in S25), it is determined that the pressed point is located in the surrounding region and the process of S27 is performed. In S27, the CPU 14 performs a process of changing the x coordinate Dx to the x coordinate P2x. Accordingly, a conversion process of converting the x coordinate Dx of the pressed point into a coordinate in the image display region 81 is performed. Then, the process of S31 is performed.

In S31, the CPU 14 determines whether the y coordinate Dy of the pressed point is smaller than the y coordinate P1y of the first point P1. When it is determined that the y coordinate Dy is smaller than the y coordinate P1y (YES in S31), it is determined that the pressed point is located in the surrounding region 13 and the process of S33 is performed. In S33, the CPU 14 performs a process of changing the y coordinate Dy to the y coordinate P1y. Accordingly, a conversion process of converting the y coordinate Dy of the pressed point into a coordinate in the image display region 81 is performed. Then, the process of S41 is performed. On the other hand, when it is determined that the y coordinate Dy is equal to or greater than the y coordinate P1y (NO in S31), the process of S35 is performed.

In S35, the CPU 14 determines whether the y coordinate Dy of the pressed point is greater than the y coordinate P2y of the second point P2. When it is determined that the y coordinate Dy is equal or less than the y coordinate P2y (NO in S35), the process of S41 is performed. On the other hand, when it is determined that the y coordinate Dy is greater than the y coordinate P2y (YES in S35), it is determined that the pressed point is located in the surrounding region 13 and the process of S37 is performed. In S37, the CPU 14 performs a process of changing the y coordinate Dy to the y coordinate P2y. Accordingly, a conversion process of converting the y coordinate Dy of the pressed point into a coordinate in the image display region 81 is performed. Then, the process of S41 is performed.

In this way, by performing the conversion process in S21 to S37, the area of the button reaction region RR can be substantially extended by the surrounding button reaction region SRR (the hatched portion in FIG. 5).

In S41, the CPU 14 determines whether the pressed point is located in any one button reaction region RR. This determination is performed by comparing the pressed coordinate with the coordinate of the button reaction region acquired with reference to the button table (not shown) stored in the NVRAM 40. When it is determined that the pressed point is not located in the button reaction region (NO in S41), the flow is ended. On the other hand, when it is determined that the pressed point is located in the button reaction region (YES in S41), the process of S43 is performed.

In S43, the CPU 14 refers to the button table stored in the NVRAM 40. Then, the CPU selects the process allocated to the button reaction region specified by the pressed point.

In S45, the CPU 14 performs a button pressing process. In the button pressing process, the process selected from the button table is performed. For example, when the selected process details is the "menu display", the display of the LCD 72 is changed to the menu.

A specific example will be described with reference to the flowchart shown in FIG. 6. For example, the operations when a pressed point PP (N−1, 1) (FIG. 5) in the surrounding button reaction region SRR is pressed by the user will be described. When the pressed point PP is pressed (YES in S15), the pressed coordinate (Dx, Dy)=(N−1, 1) is acquired (S17). When it is determined that the x coordinate Dx is equal to or greater than the x coordinate P2x (=N−2) (Yes in S25), the x coordinate Dx is converted into N−2 (S27). When it is determined that the y coordinate Dy is smaller than the y coordinate P1y (=2) (YES in S31), the y coordinate Dy is converted into 2 (S33). Accordingly, the pressed point PP in the surrounding region 13 is converted into a pressed point CPP in the image display region 81. When it is determined that the converted pressed point CPP is located in the button reaction region RR (YES in S41), the button table stored in the NVRAM 40 is referred to (S43) and the process corresponding to the button reaction region is performed (S45). Accordingly, it is possible to substantially extend the button reaction region RR to the extended button reaction region ERR.

The advantages of the display panel 50 according to the first embodiment will be described. A height difference from the display plane of the image display region 81 is formed around the image display region 81 by the opening 83 of the LCD upper cover 77. Then, when the user intends to press the button display region BR displayed in the vicinity of the opening 83, it is difficult to press the button display region BR due to the opening 83, thereby reducing the user's convenience. However, in the display panel 50 according to this embodiment, since the size of the image display region 81 of the LCD 72 is smaller than the size of the touch panel reaction region 82 of the touch panel 75, the surrounding region 13 in which the image display region 81 does not exist but the touch panel reaction region 82 exists is formed. When the pressed point is located in the surrounding button reaction region SRR, the conversion process of converting the pressed coordinate into the coordinate in the button reaction region RR is performed. The process corresponding to the button reaction region in which the converted pressed point exists is selected and performed.

Accordingly, as shown in FIG. 5, the button reaction region RR corresponding to the button display region BR displayed at an end of the image display region 81 can be substantially extended to the extended button reaction region ERR. Therefore, it is easy to press the button display region BR displayed in the vicinity of the opening 83, thereby enhancing the user's convenience.

Figure 7:
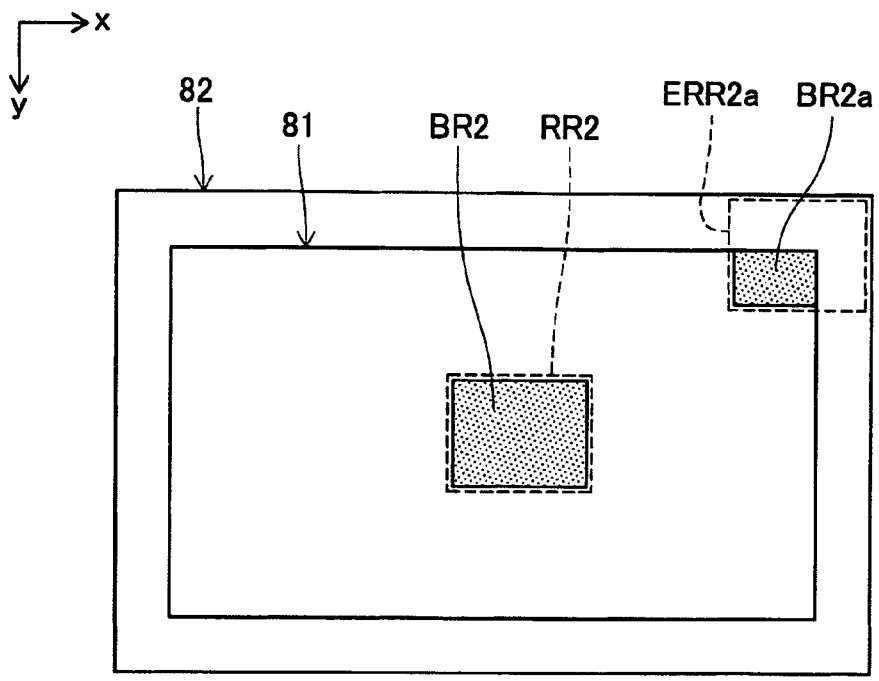
FIG. 7 is a diagram illustrating a second embodiment.

A second embodiment will be described with reference to FIG. 7. In the second embodiment, a button displayed in the vicinity of the center of the image display region 81 and the button displayed at an end of the image display region 81 are different from each other in button size. In case of a button display region BR2 displayed in the vicinity of the center, the button display region BR2 and a button reaction region RR2 overlap with each other and are equal to each other in area. On the other hand, in case of a button display region BR2$a$ displayed at an end, the area of the button display region BR2$a$ is smaller than that of the button display region BR2 displayed in the vicinity of the center, and the area of an extended button reaction region ERR2$a$ existing at the end is equal to that of the button reaction region RR2 existing in the vicinity of the center.

Accordingly, it is possible to cause the size of the button reaction region to be constant at the end and the center while setting the button size at the end of the image display region 81 to be smaller than the button size at the center. Accordingly, since a button at the end can be displayed to be small without damaging the operability of the button at the end, it is possible to increase the number of buttons which can be displayed in the image display region 81.

Figure 8:
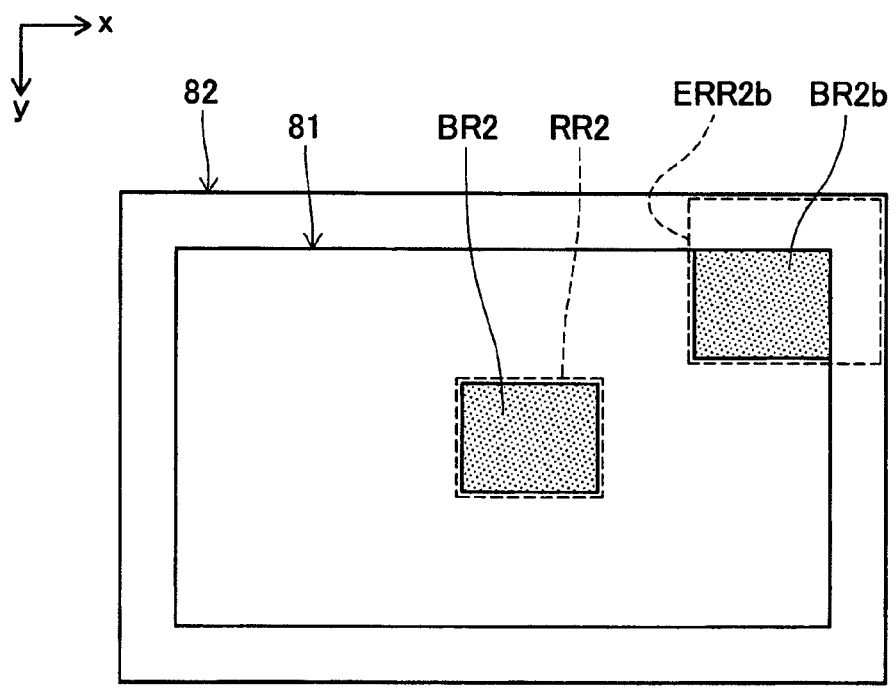
FIG. 8 is a diagram illustrating a third embodiment.

A third embodiment will be described with reference to FIG. 8. In the third embodiment, a button reaction region existing in the vicinity of the center of the image display region 81 is different in size from a button reaction region existing at an end of the image display region 81. In case of the button display region BR2 displayed in the vicinity of the center, the button display region BR2 and the button reaction region RR2 overlap with each other and are equal to each other in area. On the other hand, in case of the button display region BR2$b$ displayed at the end, the button display region BR2$b$ is equal in size to the button display region BR2 displayed in the vicinity of the center, and the area of the extended button reaction region ERR2$b$ existing at the end is greater than that of the button reaction region RR2 existing in the vicinity of the center.

Accordingly, it is possible to set the size of the button reaction region at the end to be greater than that in the vicinity of the center while setting the size of the button at the end of the image display region 81 to be equal to the size of the button at the center. Therefore, it is possible to enhance the operability of the button displayed at the end.

A fourth embodiment will be described with reference to FIG. 9. The fourth embodiment provides a first example of the method of forming the button reaction region extending into the surrounding region. At an end in the x direction of the image display region 81, a button display region BR3 is displayed to contains the outer periphery in the x direction of the image display region 81. The button display region BR3 has a circular shape and includes a button reaction region RR3. A surrounding button reaction region SRR3 exists in the surrounding region 13 opposed in the x direction to the button display region BR3 with the outer periphery of the image display region 81 interposed therebetween. Accordingly, the maximum width WY in the y direction of the button display region BR3 can be projected to the surrounding region 13. When it is determined that the pressed coordinate is a coordinate in the surrounding button reaction region SRR3, the CPU 14 selects and performs a process corresponding to the button reaction region RR3.

Similarly, by projecting the maximum width WX in the x direction of the button display region BR4 to the surrounding region 13, a surrounding button reaction region SRR4 is defined for the button display region BR4. When it is determined that the pressed coordinate is a coordinate in the surrounding button reaction region SRR4, the CPU 14 selects and performs a process corresponding to the button reaction region RR4.

Accordingly, in case of a button display region other than the rectangular shape, such as a circular shape, it is possible to properly guarantee the surrounding button reaction region in the surrounding region 13.

A fifth embodiment will be described with reference to FIGS. 10 and 11. The fifth embodiment provides a second example of the method of forming the button reaction region extending into the surrounding region. As shown in FIG. 10, at an end in the x direction of the image display region 81, a button display region BR5 is displayed to contain the outer periphery in the x direction of the image display region 81. The button display region BR5 has a parallelepiped shape and includes a button reaction region RR5. A surrounding button reaction region SRR5 exists at a position in the surrounding region 13 opposed in the x direction to the button display region BR5 with the outer periphery of the image display region 81 interposed therebetween. The surrounding button reaction region SRR5 is defined by projecting the outer periphery (that is, the right side portion of the button display region BR5) of the image display region 81 included in the button display region BR5 to the surrounding region 13. When it is determined that the pressed coordinate is a coordinate in the surrounding button reaction region SRR5, the CPU 14 selects and performs a process corresponding to the button reaction region RR5. Similarly, a surrounding button reaction region SRR6 is defined for a button display region BR6 by projecting the upper side portion of the button display region BR6 to the surrounding region 13. When it is determined that the pressed coordinate is a coordinate in the surrounding button reaction region SRR6, the CPU 14 selects and performs a process corresponding to the button reaction region RR6.

As shown in FIG. 11, a button display region BR7 is displayed at an end in the x direction of the image display region 81 to contain the outer periphery in the x direction of the image display region 81. The button display region BR7 has a parallelepiped shape and includes a button reaction region RR7. By extending sides (that is, the upper side and the lower side) extending in the x direction out of sides of the button display region BR7 to protrude into the surrounding region 13, a surrounding button reaction region SRR7 is defined in the surrounding region for the button reaction region RR7. When it is determined that the pressed coordinate is a coordinate in the surrounding button reaction region SRR7, the CPU 14 selects and performs a process corresponding to the button reaction region RR7.

Similarly, by extending sides (that is, the right side and the left side) extending in the y direction out of sides of a button display region BR8 to protrude into the surrounding region 13, a surrounding button reaction region SRR8 is defined in the surrounding region for the button display region BR8. When it is determined that the pressed coordinate is a coordinate in the surrounding button reaction region SRR8, the CPU 14 selects and performs a process corresponding to the button reaction region RR8.

Accordingly, the button display region can be projected to the surrounding region 13 in the direction in which the sides of the button display region extends. Therefore, in case of a button display region other than the rectangular shape, such as a parallelepiped shape, it is possible to properly guarantee the button reaction region to the outside of the image display region 81.

Figure 12:
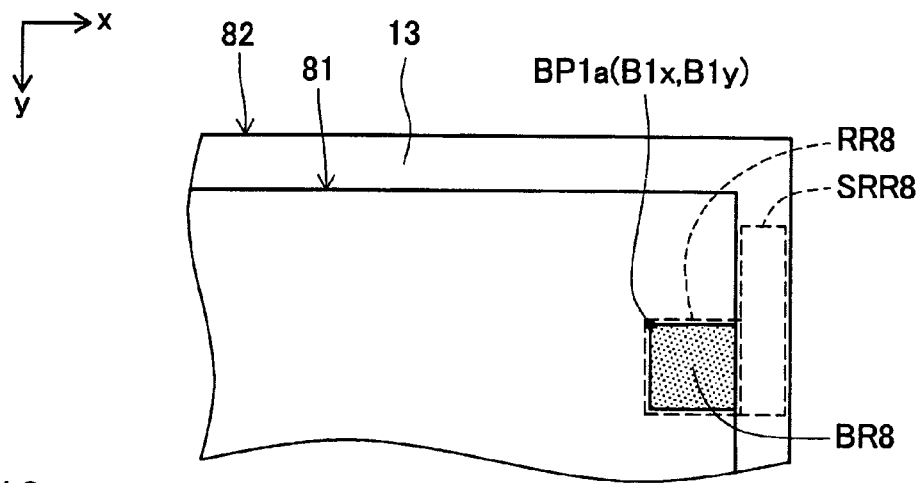
FIG. 12 is a diagram illustrating a sixth embodiment.

A sixth embodiment will be described with reference to FIG. 12. The sixth embodiment provides a third example of the method of forming the button reaction region extending into the surrounding region 13. As shown in FIG. 12, at an end in the x direction of the image display region 81, a button display region BR8 is displayed to contain the outer periphery in the x direction of the image display region 81. Here, the coordinate of a first point BP1a in the button display region BR8 is defined as (B1x, B1y). The y coordinate B1y of the first point BP1a is the upper maximum value in the y direction. The button display region BR8 includes a button reaction region RR8.

A surrounding button reaction region SRR8 exists at a position in the surrounding region opposed in the x direction to the button display region BR8 with the outer periphery of the image display region 81 interposed therebetween. Here, the surrounding button reaction region SRR8 is defined to exceed the y coordinate B1y (the upper maximum value in the y direction) of the first point BP1a to the upside in the y direction.

When a user presses the button display region, the finger is directed to the upside in the y direction with respect to the image display region 81. Accordingly, a force may be applied to the upside in the y direction and thus the upper region in the y direction of the button display region may be pressed. However, in the sixth embodiment, the surrounding button reaction region for the button display region located in the vicinity of the end in the x direction of the image display region 81 is defined to extend obliquely upward. Accordingly, since the surrounding button reaction region is extended to the upside in the y direction, it is possible to press the button display region more easily, thereby enhancing the convenience to a user.

Figure 13:
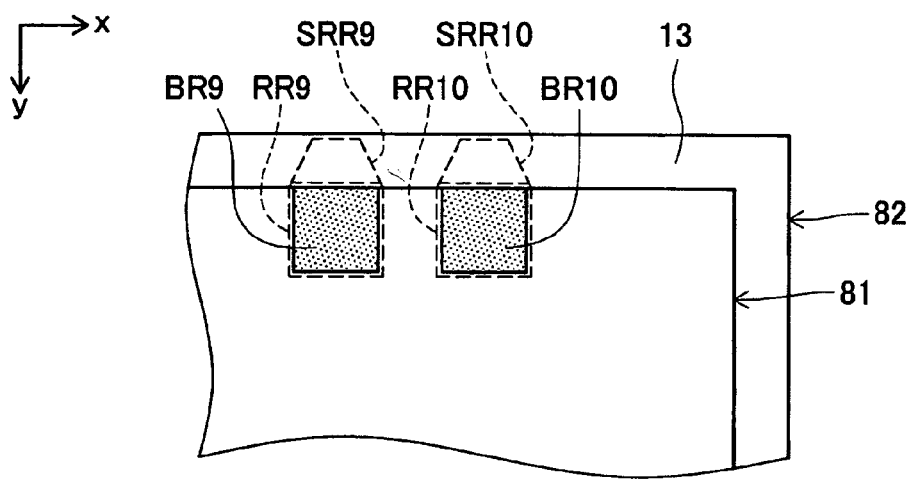
FIG. 13 is a diagram illustrating a seventh embodiment.

A seventh embodiment will be described with reference to FIG. 13. The seventh embodiment provides a fourth example of the method of forming the button reaction region extending into the surrounding region 13. As shown in FIG. 13, at an end in the y direction of the image display region 81, button display regions BR9 and BR10 are adjacently displayed to contain the outer periphery in the y direction of the image display region 81. The button display regions BR9 and BR10 have a rectangular shape and include button reaction regions RR9 and BR10, respectively. Surrounding button reaction regions SRR9 and SRR10 exist at positions in the surrounding region 13 opposed in the y direction to the button display regions BR9 and BR10 with the outer periphery of the image display region 81 interposed therebetween. Here, the surrounding button reaction regions SRR9 and SRR10 have a shape of which the width in the y direction decreases with an increase in distance from the image display region 81.

Accordingly, since the surrounding button reaction region can be formed to be narrowed and extended, it is possible to prevent the adjacent surrounding button reaction regions SRR9 and SRR10 from interfering with each other. Therefore, even when the button display regions BR9 and BR10 are close to each other, it is possible to prevent the adjacent button display regions from being erroneously pressed, thereby enhancing the convenience to a user.

Figure 15:
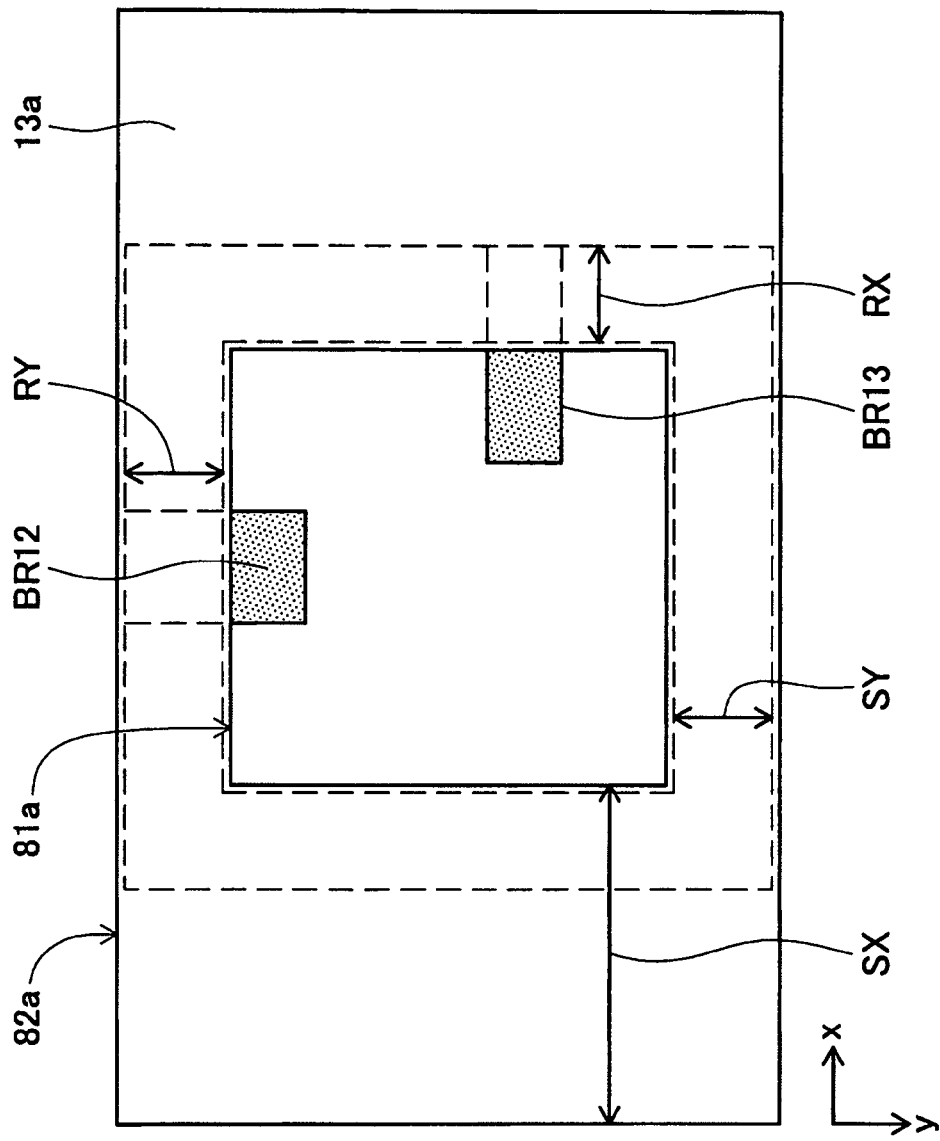
FIG. 15 is a diagram illustrating an eighth embodiment.

An eighth embodiment will be described with reference to FIG. 15. The eighth embodiment provides an example of the method of forming a surrounding button reaction region. In case of an image display region 81a and a touch panel reaction region 82a shown in FIG. 15, a surrounding width SX of a surrounding region 13a in the x direction is greater than a surrounding width SY thereof in the y direction. Here, to define the surrounding button reaction region within the surrounding region 13a, the width in the x direction and the width in the y direction are respectively referred to as a formation width RX and a formation width RY. In the eighth embodiment, the formation width RX and the formation width RY are set to be equal to each other. Accordingly, since the formation width RX and the formation width RY are set to be equal to each other, an extended button reaction region corresponding to a button display region BR12 displayed at an end in the y direction of the image display region 81a and an extended button reaction region corresponding to a button display region BR13 displayed at an end in the x direction can be set to be equal or similar in size to each other even though the surrounding widths SX and SY fo the surrounding region 13a are different from each other. Therefore, since a user can handle the buttons displayed at the ends of the image display region 81a in the same way, it is possible to enhance the convenience to a user.

The technical elements described in the specification or shown in the drawings have the technical usefulness single or in various combinations and are not limited to the combinations described in the claims as filed. The techniques described in the specification or shown in the drawings accomplish plural objects together and have the technical usefulness even when they accomplish only one object.

Figure 14:
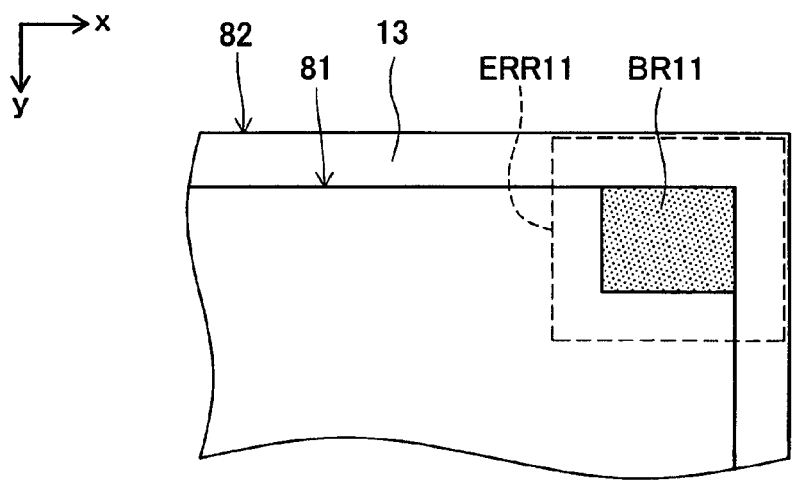
FIG. 14 is a modified example of an extended button reaction region.

As shown in FIG. 14, the extended button reaction region ERR11 may be defined such that the button reaction region is extended not only to the surrounding region 13 but also to the image display region 81. In this case, other buttons and extended button reaction regions corresponding to the other buttons should be located outside the extended button reaction region ERR11 corresponding to the button display region BR11. Accordingly, it is also possible to easily press the button display region, thereby enhancing the convenience to a user.

Although the CPU 14 performs the process of changing the x coordinate Dx to the x coordinate P1x in S23, the input device disclosed herein is not limited to this configuration. When the x coordinate Dx of the pressed point is smaller than the x coordinate P1x of the first point P1 by a value k (where k is an arbitrary value), a process of setting the x coordinate Dx=P1x+k may be performed. Similarly, when the x coordinate Dx of the pressed point is greater than the x coordinate P2x of the second point P2 by a value k in S27, a process of setting the x coordinate Dx=P2x−k may be performed. Similarly, when the y coordinate Dy of the pressed point is smaller than the y coordinate P1y of the first point P1 by a value k in S33, a process of setting the y coordinate Dy=P1y+k may be performed. Similarly, when the y coordinate Dy of the pressed point is greater than the y coordinate P2y of the second point P2 by a value k in S37, a process of setting the y coordinate Dy=P2y−k may be performed.

The LCD 72 is an example of the image display unit, the LCD upper cover 77 is an example of the cover member, the x direction is an example of the horizontal direction, the y direction is an example of the vertical direction, the coordinate P1x is an example of the horizontal minimum value, the coordinate P1y is an example of the vertical minimum value, the coordinate P2x is an example of the horizontal maximum value, and the coordinate P2y is an example of the vertical maximum value.

The control unit performing the process of S17 is an example of the coordinate acquiring unit. The control unit performing the process of S45 is an example of the first processing unit. The control unit performing the processes of S23, S27, S33, S37, and S41 is an example of the process selecting unit. The control unit performing the process of S45 is an example of the second processing unit. The control unit performing the processes of S21 to S37 is an example of the conversion unit.

What is claimed is:

1. An input device comprising:
    a display including an image display region;
    a transparent touch panel including a touch panel reaction region larger in area than the image display region;
    a cover member having an opening larger in area than the image display region and fixing the display and the transparent touch panel so that:
        the transparent touch panel is disposed on the display;
        the image display region is exposed via the touch panel reaction region from the opening; and
        a surrounding region is defined between an inner periphery of the opening and an outer periphery of the image display region in a direction parallel to a surface of the image display region,
        wherein the transparent touch panel extends over the image display region and the surrounding region in area; and
    a controller configured to:
        set a button display region for displaying a button in the image display region and not set the button display region in the surrounding region;
        set a button reaction region in the image display region to correspond to and overlap with the button display region;
        set a surrounding reaction region in the surrounding region to correspond to the button display region;
        acquire a coordinate of a pressed position where the touch panel reaction region is pressed; and
        select a process allocated to the button reaction region when the coordinate of the pressed position is located in the surrounding reaction region.

2. The input device according to claim 1, wherein the controller is configured to convert the coordinate of the pressed position into a coordinate in the button reaction region when the coordinate of the pressed position is located in the surrounding reaction region, to thereby select the process allocated to the button reaction region.

3. The input device according to claim 2,
    wherein the image display region and the touch panel reaction region have common coordinate axes in an x-direction and a y-direction orthogonal to the x-direction, the x-direction and the y-direction extending parallel with the image display region,
    wherein the image display region is defined as a rectangular shape having an x-direction minimum value, a y-direction minimum value, an x-direction maximum value, and a y-direction maximum value,
    wherein the coordinate of the pressed position is defined an x-direction pressed coordinate and a y-direction pressed coordinate, and
    wherein the controller is configured to set the x-direction minimum value as the x-direction pressed coordinate when the x-direction pressed coordinate is smaller than the x-direction minimum value, set the x-direction maximum value as the x-direction pressed coordinate when the x-direction pressed coordinate is greater than the x-direction maximum value, set the y-direction minimum value as the y-direction pressed coordinate when the y-direction pressed coordinate is smaller than the y-direction minimum value, and set the y-direction maximum value as the y-direction pressed coordinate when the y-direction pressed coordinate is greater than the y-direction maximum value.

4. The input device according to claim 1, wherein the controller is configured to set the surrounding reaction region such that when the button display region contains the outer periphery of the image display region in an x-direction, the surrounding reaction region is located opposed to the button display region in the x-direction with the outer periphery interposed therebetween, and when the button display region contains the outer periphery of the image display region in a y-direction orthogonal to the x-direction, the surrounding reaction region is located opposed to the button display region in the y-direction, the x-direction and the y-direction extending parallel with the image display region.

5. The input device according to claim 1, wherein the controller is configured to set the surrounding reaction region such that when the button display region contains the outer periphery of the image display region in an x-direction, the surrounding reaction region is shaped by extending sides of the button display region into the surrounding region in the x-direction; and
    when the button display region contains the outer periphery of the image display region in a y-direction orthogonal to the x-direction, the surrounding reaction region is shaped by extending sides of the button display region into the surrounding region in the y-direction, the x-direction and the y-direction extending parallel with the image display region.

6. The input device according to claim 1, wherein the controller is configured to set the surrounding reaction region such that when the button display region contains the outer periphery of the image display region in an x-direction, the surrounding reaction region is longer in a y-direction orthogonal to the x-direction than the image display region, the x-direction and the y-direction extending parallel with the image display region.

7. The input device according to claim 1, wherein the controller is configured to set the surrounding reaction region to have such a shape that a width of the surrounding reaction region decreases with an increase in distance from the image display region.

8. The input device according to claim 1, wherein the controller is configured to set the first and second surrounding reaction regions in the surrounding region to respectively correspond to the first and second button display regions disposed at an x-direction and a y-direction, and to set a width of the first surrounding reaction region in the x-direction to be substantially equal to a width of the second surrounding reaction region in the y-direction, the y-direction being orthogonal to the x-direction, and the x-direction and the y-direction extending parallel with the image display region.

9. The input device according to claim 1, wherein the controller is configured to select the process allocated to the button reaction region when the coordinate of the pressed position is located in the button reaction region.

10. The input device according to claim 1, wherein the surrounding region entirely surrounds the image display region.

* * * * *